US007466826B2

(12) United States Patent
Andreaux et al.

(10) Patent No.: US 7,466,826 B2
(45) Date of Patent: Dec. 16, 2008

(54) METHOD OF SECURE TRANSMISSION OF DIGITAL DATA FROM A SOURCE TO A RECEIVER

(75) Inventors: Jean Pierre Andreaux, Rennes (FR); Sylvain Chevreau, Rennes (FR); Eric Diehl, Liffré (FR)

(73) Assignee: Thomson Licensing, Boulogne-Billancourt (FR)

( * ) Notice: Subject to any disclaimer, the term of this patent is extended or adjusted under 35 U.S.C. 154(b) by 655 days.

(21) Appl. No.: 10/450,013

(22) PCT Filed: Dec. 4, 2001

(86) PCT No.: PCT/EP01/14156

§ 371 (c)(1),
(2), (4) Date: Dec. 10, 2003

(87) PCT Pub. No.: WO02/47356

PCT Pub. Date: Jun. 13, 2002

(65) Prior Publication Data

US 2004/0083364 A1 Apr. 29, 2004

(30) Foreign Application Priority Data

Dec. 7, 2000 (FR) .................................. 00 15894

(51) Int. Cl.
*H04L 9/00* (2006.01)
*H04L 9/32* (2006.01)
*G06F 7/04* (2006.01)
(52) U.S. Cl. .................. 380/277; 380/271; 380/228; 380/229; 380/231; 380/232; 380/200; 380/201; 713/168; 713/169; 713/170; 713/171; 713/172; 726/2; 726/3; 726/4; 726/5; 726/6
(58) Field of Classification Search .................. 380/277
See application file for complete search history.

(56) References Cited

U.S. PATENT DOCUMENTS 6,550,011 B1 * 4/2003 Sims, III ..................... 713/193
6,745,237 B1 * 6/2004 Garrity et al. ............... 709/219
6,904,522 B1 * 6/2005 Benardeau et al. .......... 713/156

(Continued)

FOREIGN PATENT DOCUMENTS

JP H10-41933 2/1998

(Continued)

OTHER PUBLICATIONS

A.K. Choudhury: "Copyright Protection for Electronic Publishing Over computer Networks", IEEE New York, vol. 9, No. 3, May 1995, pp. 12-20.

(Continued)

*Primary Examiner*—Longbit Chai
(74) *Attorney, Agent, or Firm*—Joseph J. Laks; Harvey D. Fried; Joel M. Fogelson

(57) ABSTRACT

To transmit digital data representing a content from a source to a receiver through a digital communication channel, the data being scrambled by at least one control word, the method includes the following steps. The source generates an encryption key which it stores temporarily. It encrypts the control word with the encryption key and transmits to the receiver the scrambled digital data and the encrypted control word, the latter being transmitted through an encrypted communication channel. The receiver then performs an operation of authentication of the source. When the source is authenticated by the receiver, it transmits the encryption key to it. The receiver then decrypts the control word and descrambles the data so as to present them to a user. The encryption key is then erased from the memories of the source and the receiver when the content has been entirely transmitted.

15 Claims, 3 Drawing Sheets

U.S. PATENT DOCUMENTS 6,944,763 B1    9/2005   Asano et al.
6,986,159 B1 *  1/2006   Shimoji et al. .............. 725/142

FOREIGN PATENT DOCUMENTS

| JP | H11-250141 | 9/1999 |
| JP | H11-352881 | 12/1999 |
| JP | H10-293827 | 4/2000 |
| WO | 00/04718 | 1/2000 |
| WO | WO 00/62476 | 10/2000 |

OTHER PUBLICATIONS

Search Report dated Aug. 8, 2002.

Hayami, Y., "Method for safely transmitting digital data from an information source to a receiver", Japan National Technology Magazine, Dec. 25, 2007, pp. 1-4, vol. 5, Distribution Journal Computer Electronics 1998, Japan.

* cited by examiner

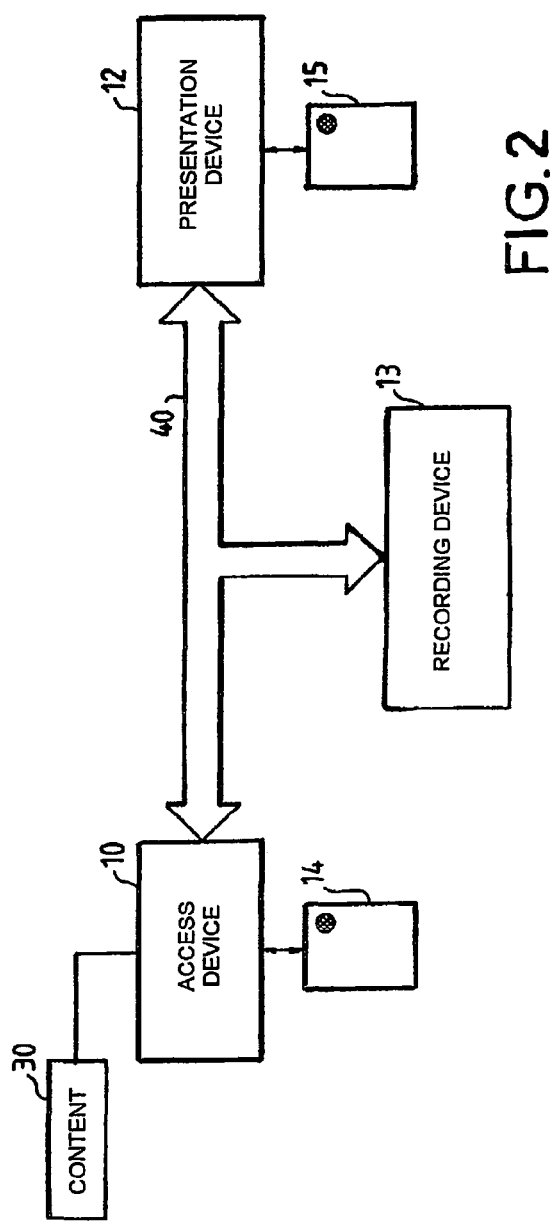
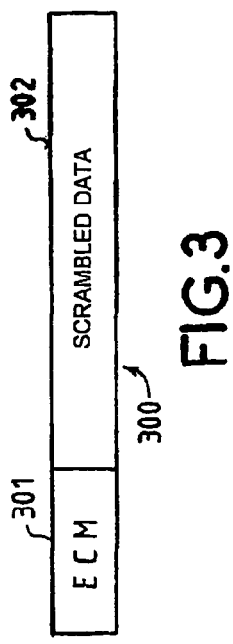
FIG.2
FIG.3

METHOD OF SECURE TRANSMISSION OF DIGITAL DATA FROM A SOURCE TO A RECEIVER

This application claims the benefit, under 35 U.S.C. § 365 of International Application PCT/EP01/14156, filed Dec. 4, 2001, which was published in accordance with PCT Article 21(2) on Jun. 13, 2002 in English and which claims the benefit of French patent application No. 0015894, filed Dec. 7, 2000.

FIELD OF THE INVENTION

The present invention relates in a general manner to the field of copy protection of digital data. It is more particularly concerned with a method of transmitting digital data representing a content from a source to a receiver, in particular in a digital network, making it possible to prevent copying of these data, or at the very least, rendering any copy unusable.

BACKGROUND ART

It is known practice to associate with digital data representing a content, in particular a video or audio sequence, copy control information items commonly denoted CCI (standing for "Copy Control Information") or else CGMS (standing for "Copy Generation Management System").

These information items, which are inserted into the data by the content provider, generally define four possible states for the data:

copying authorized ("copy free");

a single generation (or a given number of generations) of copying authorized ("copy once" or "copy N times");

no more copying authorized ("copy no more");

copying never authorized ("copy never").

When the data belong to the last two categories, they may not be copied. That is to say they may only be viewed and/or listened to, when dealing with video and/or audio data, for example but they may not be recorded, or if a recording is made illicitly, it must not be possible to reuse it later.

A first approach for guaranteeing this result consists in having any recording apparatus verify the aforesaid control data and, should data whose copying is unauthorized be detected, in disabling the recording.

However, this type of approach has restrictions since it can only operate with compliant (non "pirated") recording apparatus.

Moreover, another method has been proposed in order that, when data are broadcast in a digital network such as a domestic digital network, they can only be copied within the network. To do this, the data which are broadcast in the digital network are scrambled with control words and these control words are encrypted with the aid of keys specific to the digital network around which the data flow. Thus, if copies of these data are made, they can only be played back within the digital network in which they have been copied. Refer to the French Patent Application of THOMSON multimedia, published as No. FR-A-2 792 482, for further details with regard to this matter.

However, this method does not allow the complete prevention of copying. There are in fact cases where content providers desire data to be broadcast in "live" in a digital network but do not want it to be possible to make copies in order to replay this content later in the network. A typical example relates to the broadcasting of films by digital television operators.

SUMMARY OF THE INVENTION

An aim of the invention is therefore to propose a method making it possible to broadcast a content, in particular in a digital network, without it being possible to copy it.

The invention accordingly relates, according to a first aspect, to a method of transmitting digital data representing a content from a source to a receiver through a digital communication channel, the digital data being scrambled by at least one control word. The method includes the following steps implemented by the source.

The first step consists in generating an ephemeral encryption key stored temporarily by the source.

The second step consists in encrypting the control word with this ephemeral encryption key.

The third step consists in transmitting to the receiver:

the scrambled digital data; and the encrypted control word, the latter being transmitted through an encrypted communication channel between the source and the receiver.

The fourth step consists in responding to an operation of authentication of the source by the receiver and, when the source is authenticated by the receiver, transmitting the encryption key to the receiver.

The fifth step consists in erasing the encryption key.

According to a particular characteristic of the invention, a new ephemeral encryption key is generated randomly by the source for each content transmitted.

According to a particular embodiment of the invention, an information item relating to the period of validity of the digital data to be transmitted is affixed to the data and the fifth step is performed after the expiry of this period of validity.

According to another particular embodiment, an information item indicating the number of times the content can be transmitted to a receiver is affixed to the data. This information item is stored temporarily by the source in a counter of access to the content and, before the fifth step, the counter of access to the content is decremented; and a test is performed to verify whether the counter of access to the content is equal to zero. The fifth step is executed only in the case of a positive response to the test.

According to a particular characteristic of the invention, the method furthermore includes, before or after the first step, a step consisting in generating an ephemeral authentication key, the authentication key being transmitted to the receiver, in the third step, through the encrypted communication channel.

Preferably, a new ephemeral authentication key is generated randomly by the source for each content transmitted.

According to a particular embodiment of the invention, in the fourth step, the authentication operation comprises the substeps consisting in receiving a random number from the receiver; performing a calculation on the basis of the random number and of the authentication key; and transmitting the result of the calculation to the receiver.

According to a particular characteristic of this embodiment, the encryption key is transmitted to the receiver with the result of the calculation in the third subset above.

According to another particular embodiment of the invention, the encryption key is transmitted to the receiver, in the fourth step, through the encrypted communication channel.

The invention also relates, according to a second aspect, to a method of transmitting digital data representing a content from a source to a receiver through a digital communication channel, the digital data being scrambled by at least one control word. The method comprises the following steps implemented by the receiver.

The first step consists in receiving the scrambled digital data.

The second step consists in receiving the encrypted control word encrypted with an encryption key, the encrypted control word being transmitted through an encrypted communication channel between the source and the receiver.

The third step consists in performing an operation of authentication of the source and, when the source is authenticated by the receiver: receiving and temporarily storing the encryption key; decrypting the control word with the encryption key; descrambling, with the aid of the decrypted control word, the digital data so as to transform them into a signal able to be presented to a user; and erasing the encryption key.

According to a particular embodiment of the invention, an ephemeral authentication key is furthermore received in the aforesaid second step, the authentication key being transmitted through the encrypted communication channel.

According to a particular characteristic of this embodiment, the authentication operation performed in the aforesaid third step comprises the subsets consisting: in generating a random number; in sending the random number to the source; in receiving from the source the result of a calculation performed on the basis of the random number and of the authentication key; and in verifying the result of the calculation, on the basis of the random number generated in the first substep and of the authentication key received in the second step.

According to another particular characteristic of this embodiment, the encryption key is received by the receiver with the result of the calculation in the third subset above.

According to another aspect of the invention, copy control information items are fixed to the digital data to be transmitted and the steps of the methods described above are only implemented when the copy control information items indicate that the digital data are of "copying unauthorized" type.

According to yet another aspect of the invention, the methods described above are implemented in a domestic digital network between a device for access to a content and a device for presentation of the content. The digital communication channel is formed of a digital bus to which the access device and the presentation device are attached.

Preferably, steps 1 to 5 of the method according to the first aspect of the invention are implemented in a removable security module attached to the source. Likewise, steps 1 to 3 of the method according to the second aspect of the invention are implemented in a removable security module attached to the receiver.

BRIEF DESCRIPTION OF THE DRAWINGS

The invention will be better understood upon reading the following description of particular, nonlimiting embodiments thereof given with reference to the appended drawings, in which:

FIG. 2 is a diagram in the form of functional blocks of a domestic digital network in which the invention is implemented according to a second embodiment of the invention;

FIG. 3 diagrammatically illustrates the form of the data representing a digital content in the second embodiment of the invention.

DESCRIPTION OF THE PREFERRED EMBODIMENTS

Figure 1:
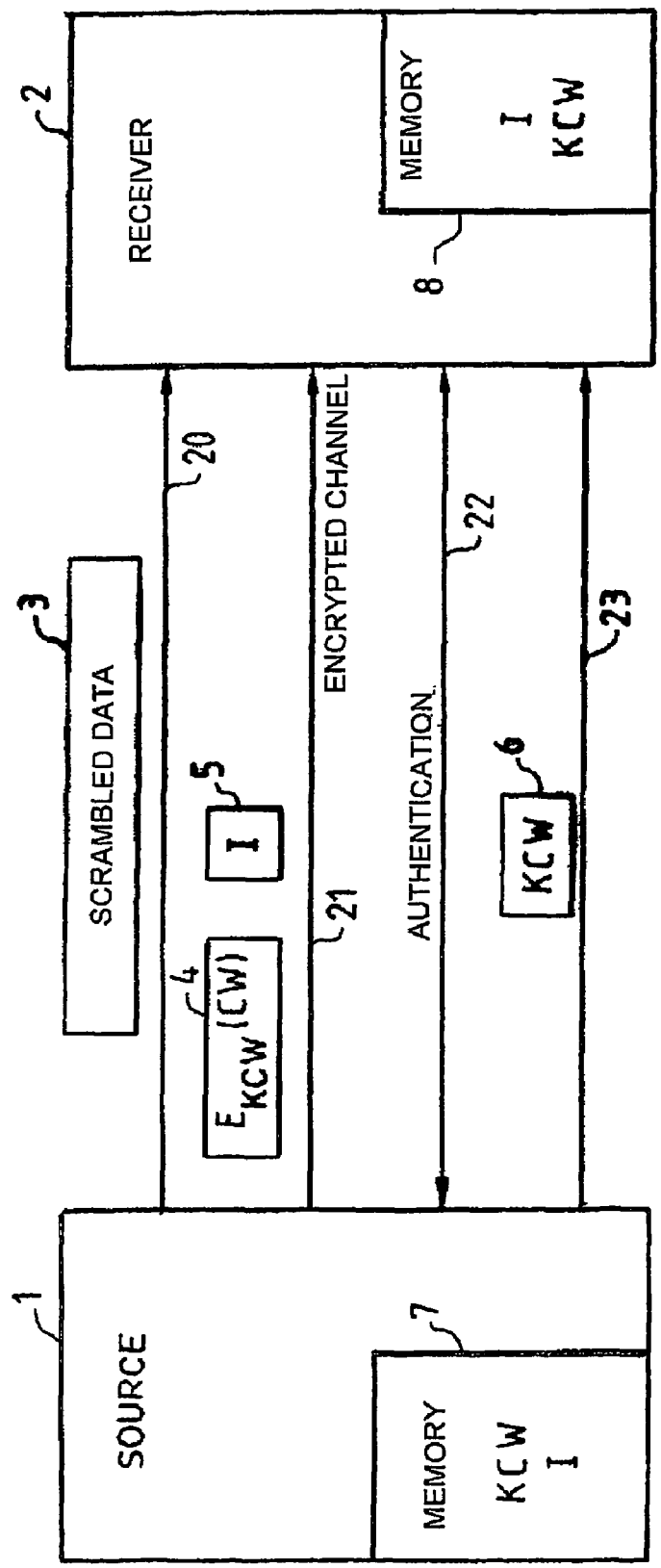
FIG. 1 diagrammatically illustrates a first embodiment of the invention.

FIG. 1 diagrammatically represents a source 1 capable of sending digital data representing a content to a receiver 2. The source 1 is a device, which receives digital data from a content provider so as to transmit them, through a digital communication channel, to a receiver device 2 capable of presenting them to an end user.

The method of the invention aims to prevent the illicit copying of data when the latter travel through the digital communication channel between the source and receiver. It is aimed more precisely at preventing, should the data be recorded, the possibility of their being "replayed" by the receiver device so as to be presented to a user.

More specifically, the source 1 is for example a digital decoder receiving digital television programs from a broadcaster and the receiver 2 is a digital television while the communication channel is a domestic digital network.

The content is transmitted from the source 1 to the receiver 2 in the form of scrambled data 3 scrambled by a control word commonly denoted CW. It will be noted that the data are scrambled either at the level of the source 1, or by the content provider.

To guarantee security of transmission and prevent the data from being recorded then replayed by the receiver 2, the following measures are adopted.

Firstly, the source 1 generates, for each content transmitted, an ephemeral encryption key KCW which in the subsequent description will be referred to as the content key and which is stored temporarily in a memory 7 of the source. This content key KCW is produced by a pseudo-random number generator located inside the source 1. This generator is the closest possible approximation to a truly-random number generator ("True Random Number Generator" as described in "*Handbook of applied cryptography*, Alfred J. Menezes, Paul C. van Oorschot, Scott A. Vanstone, 1997, pages 165-173") so that the probability of generating the same content key value twice is very low.

In the same manner the source 1 also generates a secret identifier I for each content and stores it in its memory 7. This identifier I will subsequently serve to authenticate the source 1 as will be seen hereinbelow.

The control word CW is then encrypted with the content key KCW. Next, the encrypted control word $E_{KCW}(CW)$ 4 as well as the secret identifier I 5 are transmitted from the source to the receiver through an encrypted communication channel 21.

It will be noted that throughout the description, the following notation is adopted:

$E_K(M)$ represents an operation of encrypting data M with a key K irrespective of the encryption algorithm used;

$D_K(M)$ represents an operation of decrypting data M with a key K irrespective of the decryption algorithm used; and

| represents a data concatenation operation.

The encrypted communication channel 21 from the source 1 to the receiver 2 can be created, in a manner known per se, by performing symmetric or asymmetric encryption of the information which travels through this channel.

In a first variant embodiment using symmetric encryption, it is assumed that the source 1 and the receiver 2 already possess a pre-shared secret key S. The source 1 (but possibly the receiver 2) randomly generates a session key SSK The source 1 encrypts SSK by using its key S and transmits the result $E_S(SSK)$ to the receiver 2. The receiver 2 decrypts $E_S(SSK)$ by using the preshared secret key S and retrieves SSK. Then, the encrypted control word $E_{KCW}(CW)$ 4 and the secret identifier I 5 are encrypted with this session key SSK at the level of the source 1 before being transmitted to the receiver 2 which decrypts them with the aid of the same session key SSK.

To summarize, the following operations are performed:

by the source: $E_{SSK}(E_{KCW}(CW)|I)$;

by the receiver: $D_{SSK}(E_{SSK}(E_{KCW}(E_{KCW}(CW)|I))=E_{KCW}(CW)|I$.

In a second variant embodiment using asymmetric encryption, it is assumed that the receiver 2 possesses a private key $K_{PRI\_R}$ and public key $K_{PUB\_R}$ pair and that it has previously transmitted its public key, certified, in a manner known per se, by a certifying authority, to the source 1.

The source 1 therefore performs the following operation for encrypting the information to be transmitted (which comprises the encrypted control word 4 and the secret identifier I 5) with the public key of the receiver $K_{PUB\_R}$:

$$E_{K_{PUB\_R}}(E_{KCW}(CW)|I)$$

On receiving these information items, the receiver 2 then performs the inverse operation for decrypting, with its private key $K_{PRI\_R}$, the information items received:

$$D_{K_{PRI\_R}}(E_{K_{PUB\_R}}(E_{KCW}(CW)|I))$$

It will be noted that the transmission 20 of the scrambled data 3 is not necessarily synchronous with the transmission 21 of the encrypted control word 4 and of the secret identifier I.

When the receiver 2 has received the scrambled data 3 corresponding to a content as well as the secret identifier I 5 and the encrypted control word 4 relating to this content, it stores the identifier I in its memory 8 and it performs an operation 22 for authenticating the source 1.

This operation, known in the literature and by the person skilled in the art as the "identification" operation or "entity authentication" operation (see in particular the work "*Handbook of applied cryptography*, Alfred J. Menezes, Paul C van Oorschot, Scott A. Vanstone, 1997, pages 24-25"), is aimed at assuring the receiver 2 that the device which has just sent it a content is indeed the source 1 and that the latter is active at the time that the authentication operation takes place.

In practice, the receiver 2 authenticates via a protocol, known to the person skilled in the art as the "challenge-response protocol", the fact that the source 1 knows the secret identity I associated with the content received. For example, the receiver 2 sends a random number $n_i$ (also called "challenge") to the source 1 so that the latter performs a calculation $F(I, n_i)$, where F is a function such that it is impossible to calculate $F(I, n_i)$, knowing F, $n_i$ and not knowing I. Stated otherwise, only an entity knowing I can calculate $F(I, n_i)$. It will in particular be possible to use the function HMAC-SHA-1, described in particular in "*Keyed-Hashing for Message Authentication*, RFC 2104, February 1997, Krawczyk et al.", available at the following Internet address: ftp://ftp.isi.edu/in-notes/rfc2104.txt.

The result $F(I, n_i)$ is sent to the receiver 2 which can thus verify, by calculating $F(I, n_i)$ at its end and by comparing the result with the value received, that the source 1 knows I and is indeed the entity which sent it the content as well as the information $E_{KCW}(CW)|I$.

It will be noted that if an illicit recording of the streams which travel between the source 1 and the receiver 2 is performed, the apparatus which will perform the recording will not have access to the secret identifier I (transmitted by the encrypted communication channel 21) and will therefore be unable to respond correctly to the authentication operation 22. The receiver will in this case refuse to descramble the scrambled data 3.

If the source 1 is authenticated by the receiver 2, then the content key KCW 6 is transmitted to the receiver in step 23 and it is stored temporarily by the latter in its memory 8. The receiver is then able to decrypt the control word CW by performing the following operation:

$$D_{KCW}(E_{KCW}(CW));$$

then to descramble the data 3 so as to present them to a user.

Once the content has been presented to the user, the receiver no longer needs the secret identifier I and the content key KCW and it erases them from its memory 8.

At the level of the source 1, when the content key KCW 6 has been sent to the receiver 2 (step 23), it is erased from the memory 7 as is the secret identifier I. It is therefore no longer possible to transmit these items of information for possible subsequent playback of the data corresponding to the content transmitted.

Thus, the aim of the invention is achieved and the data representing the content are read only once by the receiver.

As a variant, in order to further increase the security of the method proposed, it is possible to transmit the content key KCW via the encrypted communication channel 21. In this case, it will be noted that when the first variant embodiment of the encrypted channel is used, the session key SSK is stored by the source 1 and by the receiver 2 in their respective memories 7 and 8 until the content key KCW is transmitted, after which the session-key SSK is erased from the memories of the source and of the receiver.

In the embodiment just described, the content key KCW and the secret identifier I are erased from the memory 7 as soon as the content has been transmitted from the source 1 to the receiver 2.

However it is also possible, in a preferred variant of this embodiment, for the content to have a period of validity during which it can be transmitted to the receiver or for it to be possibly transmitted a specified number of times from the source to the receiver.

In the case where the content has a certain period of validity, the information item relating to this period of validity is affixed to the data representing the content and this information item is stored by the source 1 at the same time as the content key KCW and the identifier I. Next, when the key KCW 6 has been sent by the source 1 to the receiver 2 in step 23, a check verifies whether the period of validity of the corresponding content has or has not expired (for example by comparing this period with an internal clock of the source) and, only in the case where the period of validity has expired, the key KCW and the identifier I are erased from the memory 7 of the source. It will also be noted that when the first variant embodiment of the encrypted channel is used, the session key SSK is stored by the source 1 and by the receiver 2 in their respective memories 7 and 8 until the period of validity of the content has expired.

In the case where the content can be transmitted a specified number of times to the receiver, this number is affixed to the data representing the content and is stored by the source 1 in a counter, at the time that the key KCW and the identifier I are stored in the memory 7 of the source. This counter will then be decremented each time the key KCW is sent (step 23) to the receiver 2. When the counter is at zero, the key KCW and the identifier I are erased from the memory 7 of the source. Moreover, as above, when the first variant embodiment of the encrypted channel is used, the session key SSK is stored by the source 1 and by the receiver 2 in their respective memories 7 and 8 until the aforesaid counter is equal to zero.

Figure 4:
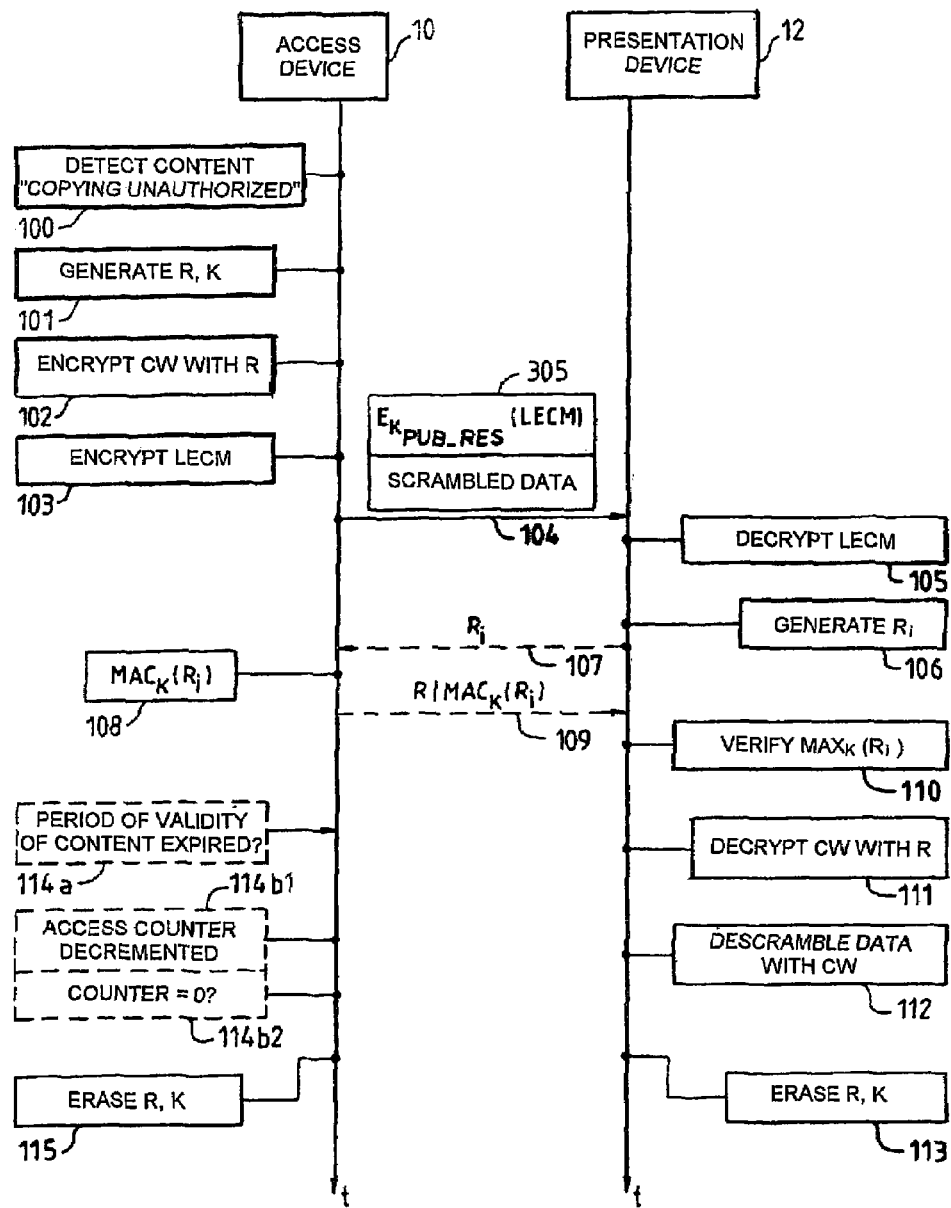
FIG. 4 illustrates the exchanges involved between elements of FIG. 2 during the implementation of the second embodiment of the invention.

We shall now describe, in conjunction with FIGS. 2 to 4, a second embodiment of the invention.

Represented in FIG. 2 is a domestic digital network containing an access device 10 linked by a bidirectional digital bus 40, preferably a bus according to the IEEE 1394 standard, on the one hand to a presentation device 12 and on the other hand to a digital recording device 13.

The access device 10 constitutes the source of the data in the network or the point of entry of any content 30 to the network. It is for example a digital decoder which receives digital data broadcast by satellite, over the airwaves (or terrestrially) or by cable. It may also be an optical disc reading apparatus broadcasting over the digital network data read from a disc, in particular a DVD (standing for "Digital Versatile Disc"). It may also be an apparatus adapted to receive data from the Internet by real-time downloading (also known as "streaming"), that is to say while viewing the content as and when loaded.

Naturally, even if just one access device is represented in FIG. 2, a domestic digital network can contain several devices of this type which each constitute sources broadcasting digital contents over the bus 40.

The presentation device 12 makes it possible to transform the digital data received from the bus 40 into a signal representative of the content intended to be presented to an end user. It is for example a digital television or a loudspeaker.

The digital recording device 13 is, for its part, capable of recording the data streams which flow around the bus 40 so as to replay them subsequently. It is for example a digital video recorder, a hard disk type storage device or an apparatus capable of recording optical discs of the DVD type.

Naturally, the domestic digital network can also contain several presentation devices as well as several recording devices.

Moreover, even if the three types of devices mentioned above have been represented separately, it is entirely possible for one and the same apparatus to contain two types of devices, or even three. For example, a digital television can contain a built-in decoder able to directly receive a content from outside the network. In this case, the invention will apply in the same way except that the digital data will travel via an internal bus to the apparatus (between the part of the apparatus constituting the access device and the part constituting the presentation device) instead of travelling via the bus 40.

Preferably, the access device 10 and the presentation device 12 each possess a smart card reader adapted to receive a card 14 and a card 15 respectively. Each of the smart cards 14, 15 includes a secure processor which, as is well known to the person skilled in the art, allows secure storage of data such as cryptographic keys. The usefulness of the smart cards 14 and 15 will be explained subsequently.

The content 30 which is received by the access device 10 preferably consists of packets of digital data scrambled by control words denoted CW as is commonly used in the broadcasting of pay-per-view digital television programmes. The control words CW are periodically renewed and are stored in control messages denoted ECM (standing for "Entitlement Control Message"), which are affixed to the corresponding scrambled data packets.

FIG. 3 diagrammatically illustrates the content of a data packet 300 representing the content 30. This data packet includes scrambled digital data 302 and a control message ECM 301 which contains the control word CW used to scramble the data. Naturally, a content, in particular a video sequence belonging to a televised programme, is formed of a succession of data packets of the type of the packet 300. It will also be noted that generally, the messages ECM containing the control words which served to scramble digital data are transmitted in advance, in the data stream, relative to the data scrambled with these control words.

If the content 30 received by the access device 10 is not already in the form described above, it is converted by the access device so as to consist of data packets as illustrated in FIG. 3.

It will be noted, moreover, that the digital data representing the content 30 contain copy control information items defining the status of the data with regard to copying. These information items are preferably inserted into the ECM messages and define, as was seen above, four possible states:

copying authorized ("copy free");

a single generation (or a given number of generations) of copying authorized ("copy once" or "copy N times");

no more copying authorized ("copy no more");

copying never authorized ("copy never").

The protocol according to the invention, as described below in conjunction with FIG. 4, makes it possible to guard against data belonging to the last two categories above (data of the "copying unauthorized" type) from being copied when they are transmitted from the access device 10 to the presentation device 12.

Moreover, other information items may be affixed to the data representing the content 30:

an information item relating to the period of validity of the data, that is to say the period during which they can be transmitted from the access device 10 to the presentation device 12; and/or an information item relating to the number of times the data can be transmitted from the access device 10 to the presentation device 12.

Represented in FIG. 4 by two downward vertical axes t is the time axis so as to illustrate the processing operations performed by the access device 10 and the presentation device 12 as well as the exchanges between these devices when a new content 30 is to be broadcast over the domestic digital network.

During a first step 100, the access device 10 detects, as a function of the copy control information items inserted into the data, whether the content is such that copying is unauthorized.

If copying of the content is authorized, then the data are transmitted in a conventional manner over the network. If, on the other hand, the content received is of the "copying unauthorized" type, then the access device generates, in step 101:

a first random number R which constitutes an ephemeral encryption key which will be referred to as the "content key" in the subsequent description, and a second random number K which constitutes an ephemeral authentication key which will be referred to for greater convenience as the "authentication key" in the subsequent description.

K and R are generated, for each content 30 received, by a pseudo-random number generator such that the probability of generating the same content key value R or authentication key value K twice is very low.

The content key R and the authentication key K are stored temporarily by the access device 10 which erases them, as will be seen below, once the content has been fully transmitted to a presentation device, possibly after the expiry of a period of validity of the content or after the latter has been transmitted a specified number of times to a presentation device 12.

If an information item relating to the period of validity of the content is affixed to the data, this information item is also stored by the access device 10 before or after step 101.

Likewise, if an information item indicating the number of times the content can be transmitted to a presentation device is affixed to the data, this information item is stored in a counter by the access device 10 before or after step 101.

Then, for each message ECM included in the data stream constituting the content, the access device 10 extracts the control word CW and performs, in step 102, the following operation for encrypting this control word with the content key R:

CW $\oplus$ R; where $\oplus$ represents the "exclusive OR" operation (or "XOR").

The encrypted control word CW $\oplus$ R as well as the authentication key K are inserted into the message ECM in place of the initial control word. The message ECM thus transformed is denoted LECM. The message LECM comprises in particular the copy control information items which, in the present case, indicate that this content is of the "copying unauthorized" type.

The message LECM is then encrypted, in step 103, so as to be transmitted in a secure manner to the presentation device 12.

In a first preferred variant, asymmetric encryption will be used. It is assumed that as is described in the aforesaid French Patent Application FR-A-2 792 482 from the applicant, the domestic digital network possesses a private key $K_{PRI\_RES}$ and public key $K_{PUB\_RES}$ pair and that each access device 10 of the network contains the public key $K_{PUB\_RES}$ of the network and each presentation device 12 contains the private key $K_{PRI\_RES}$ of the network. The recording device 13 contains neither the public key nor the private key of the network.

According to this preferred embodiment, the message LECM is encrypted by the access device 10 with the public key of the network by performing the following operation:

$$E_{K_{PUB\_RES}}(LECM)$$

The presentation device 12 can then decrypt this message with the private key of the network by performing the operation:

$$D_{K_{PRI\_RES}}(E_{K_{PUB\_RES}}(LECM)) = LECM$$

It is also possible, in a second variant, for each presentation device 12 of the network to possess its own private key $K_{PRI\_PD}$ and public key $K_{PUB\_PD}$ pair. In this case, the presentation device 12 which wishes to receive a content of the "copying unauthorized" type from an access device 10 sends its public key $K_{PUB\_PD}$ to this device beforehand. The message LECM is then encrypted, in step 103, with this public key $K_{PUB\_PD}$ by performing the operation:

$$E_{K_{PUB\_PD}}(LECM)$$

The presentation device 12 then decrypts this message by performing the operation:

$$D_{K_{PRI\_PD}}(E_{K_{PUB\_PD}}(LECM)) = LECM.$$

In a third variant, it is possible to encrypt the message LECM by using symmetric encryption. For example, each access device 10 and each presentation device 12 of the network contains a secret key of the network $K_{S\_RES}$. The message LECM is in this case encrypted by the access device with the secret key of the network by performing the operation:

$$E_{K_{S\_RES}}(LECM)$$

It can then be decrypted by the presentation device 12 by performing the operation:

$$D_{K_{S\_RES}}(E_{K_{S\_RES}}(LECM)) = LECM$$

Finally, it is furthermore possible, in a fourth variant, to encrypt the message LECM according to a symmetric encryption algorithm by using a pre-shared secret key.

In the subsequent description it will be assumed that the message LECM has been encrypted, in step 103, with the public key $K_{PUB\_RES}$ of the network as this is described in the first preferred variant above.

In the next step 104, the data packet 305 containing the encrypted message LECM and corresponding scrambled data is despatched on the bus 40 of the domestic network in the synchronous channel of the IEEE 1394 bus, which channel customarily transports the data compressed according to the MPEG 2 standard (ISO/IEC 13818-1).

This despatch is a broadcast over the network, that is to say all the presentation devices 12 which are attached to the bus 40 are able to receive the data packet 305.

When a presentation device 12 receives the packet 305, in step 105, it decrypts the message LECM with the private key of the network $K_{PRI\_RES}$ as was seen above according to the first preferred variant embodiment of the invention.

This having been done, it detects whether the scrambled data belong to a content of the "copying unauthorized" type and, in this case, obtains the encrypted control word CW $\oplus$ R as well as the authentication key K which it stores temporarily.

In the next step 106, with the aim of authentication of the access device 10 which has despatched the packet 305 over the network, the presentation device 12 generates a random number $R_i$ and it despatches it to the access device 10 (step 107) using the asynchronous channel of the bus 40 (the despatch via the asynchronous channel of the bus 40 is represented by a dashed arrow in FIG. 4). The communication via the asynchronous channel of the bus is a communication of the "point-to-point" type, that is to say between two aforesaid devices of the network. Moreover, the asynchronous channel of the bus 40 exhibits the particular feature of not being able to be recorded by the conventional recording devices such as the device 13.

In step 108, when the access device 10 receives the number $R_i$, it performs the following calculation:

$$h_i = MAC_K(R_i),$$

where "$MAC_K(x)$" represents a "Message Authentication Code" for the message x using a key K. For further details regarding "MACs" refer to the work "*Handbook of applied cryptography*, Alfred J. Menezes, Paul C. van Oorschot, Scott A. Vanstone, 1997, page 325".

The function alluded to previously HMAC-SHA-1 will preferably be used for the calculation of $h_i$.

In the next step 109, the access device 10 despatches, via the asynchronous channel of the bus 40, the content key R as well as the result of the calculation $h_i = MAC_K(R_i)$ to the presentation device 12.

The latter then performs, in step 110, the following calculation:

$h'_i = MAC_K(R_i)$ using the number $R_i$ generated in step 106 and the authentication key K obtained by decrypting the message LECM in step 105.

If $h'_i$ is different from the number $h_i$ received from the access device 10, then the presentation device 12 does not continue any further with the process. A message is for example displayed for the attention of the user (if the presentation device comprises a display screen) so as to forewarn the latter that the content cannot be viewed (or listened to).

If on the other hand $h'_i = h_i$ then the access device 10 is authenticated. In this case, the presentation device 12 uses the content key R received to decrypt the control word CW by performing (step 111) the operation:

$$CW \oplus R \oplus R = CW.$$

The presentation device 12 can then descramble the data with the control word CW (step 112) and present the data to the user.

Steps 102 to 112 are repeated so as to transmit each data packet 300 forming the content. Next, in the following step 113, the presentation device 12 erases from its memory the content key R and the authentication key K which it had stored temporarily so as to perform the above calculations.

Once all the data packets (and the corresponding control words CW) forming the content have been transferred from the access device 10 to the presentation device 12, three variant embodiments are possible.

According to a first variant embodiment, the content key R and the authentication key K are immediately erased, in step 115, from the memory of the access device 10 so that these data can no longer be transmitted to a presentation device for possible "replay" of the content.

According to a second variant embodiment, it is assumed that an information item relating to the period of validity of the content was affixed to the data representing the content and has been stored by the access device 10 before or after step 101. In this case, during step 114*a*, a test is performed to verify whether the period of validity of the content has expired. If the response to the test 114*a* is positive, then the content key R and the authentication key K are erased from the memory of the access device 10 during step 115. If conversely the response to test 114*a* is negative, then the content key R and the authentication key K are preserved in the memory of the access device 10 until the expiry of the period of validity of the content.

According to a third variant embodiment, it is assumed that an information item indicating the number of times that the content can be transmitted to a presentation device was affixed to the data. This information item has been stored (before or after step 101) by the access device 10 in a counter which will be denoted as the "counter of access to the content". In this case, during a step 114*b*1, the counter of access to the content is decremented. Next, during a step 114*b*2, a test is performed to ascertain whether the counter of access to the content is at zero. If the response to this test 114*b*2 is positive, then the content key R and the authentication key K are erased from the memory of the access device 10 during step 115. If conversely the response to test 114*b*2 is negative, then the content key R and the authentication key K are preserved in the memory of the access device 10 in such a way as to allow a presentation device to access the content subsequently.

It will be noted that an advantage of the invention is that it allows several presentation devices attached to the domestic digital network to simultaneously access a content broadcast by an access device over the bus 40. In this particular case, the protocol just described in conjunction with FIG. 4 is executed in parallel between the access device and the various presentation devices (which share in particular the content key R and the authentication key K).

It will also be noted that, preferably, the operations performed in steps 100 to 115 just described are not implemented directly by the access device 10 or by the presentation device 12 but by the secure processors of the smart cards 14 and 15 which are inserted into respective card readers of the access device 10 and of the presentation device 12.

This solution offers enhanced security since it is almost impossible to access the data (such as the keys K and R in our example) contained in a smart card.

The invention claimed is:

1. A method for transmitting digital data representing a content from a source to a receiver through a digital communication channel, the digital data being scrambled by at least one control word, comprising the steps of:
    (a) generating an ephemeral encryption key stored temporarily by the source;
    (b) encrypting said control word using said encryption key;
    (c) transmitting to the receiver;
    the scrambled digital data;
    the encrypted control word, the latter being transmitted through an encrypted secure communication channel between the source and the receiver; and
    an authentication key:
    (d) after the transmission step, in response to the receipt of a random number, transmitting said encryption key with a result of calculation, based on said authentication key and said random number, to the receiver, where said receiver can decrypt said control word with said encryption key upon successful authentication;
    (e) erasing said encryption key in accordance with at least one transmission limitation associated with the digital data.

2. The method according to claim 1, wherein a new ephemeral encryption key is generated randomly by the source for each content transmitted.

3. The method according to claim 1, wherein an information item relating to a period of validity of the digital data to be transmitted is affixed to said data and step (e) is performed after the expiry of said period of validity.

4. The method according to claim 1, wherein an information item indicating the number of times the content can be transmitted to a receiver is affixed to said data, the information item being stored temporarily by the source in a counter of access to the content and, before step (e):

the counter of access to the content is decremented; and a test is performed to verify whether the counter of access to the content is equal to zero;

step (e) being executed only in the case of a positive response to the test.

5. The method according to claim 1, further comprising the step of generating an ephemeral authentication key, the authentication key being transmitted to the receiver, in step (c), through the encrypted communication channel.

6. The method according to claim 5, wherein a new ephemeral authentication key is generated randomly by the source for each content transmitted.

7. The method according to claim 5, wherein step (d) further comprises:

(d1) receiving said random number from the receiver;

(d2) performing a calculation on the basis of said random number and of said authentication key; and (d3) transmitting the result of the calculation to the receiver.

8. The method according to claim 1, wherein the encryption key is transmitted to the receiver, in step (d), through the encrypted communication channel.

9. The method according to claim 1, wherein copy control information items are fixed to the digital data to be transmitted and in that steps (a) to (e) of the method according to claim 1 is implemented only if the copy control information items indicate that the digital data are of "copying unauthorized" type.

10. The method according to claim 1, wherein it is implemented in a domestic digital network between a device for access to a content and a device for presentation of the content, and in that the digital communication channel is formed of a digital bus to which said access device and said presentation device are attached.

11. The method according to claim 10, wherein, in step (c) of the method according to claim 1, the scrambled digital data and the encrypted control word travel via the synchronous channel of said digital bus, the encrypted control word being contained in a message which is encrypted with a public key of the domestic digital network.

12. The method according to claim 1, wherein steps (a) to (e) are implemented in a removable security module attached to the source.

13. A method for transmitting digital data representing a content from a source to a receiver through a digital communication channel, the digital data being scrambled by at least one control word, comprising the steps of:

(i) receiving the scrambled digital data;

(j) receiving the control word encrypted using an encryption key said encrypted control word being transmitted through an encrypted secure communication channel between the source and the receiver;

(k) receiving an ephemeral authentication key;

(l) after reception of said encryption key with a result of calculation, based on the ephemeral authentication key and a random number, performing an operation of authentication of the source and, when the source is authenticated by the receiver:

decrypting said control word with said encryption key upon successful authentication;

descrambling, with the aid of the decrypted control word, said digital data so as to transform them into a signal able to be presented to a user; and erasing said encryption key in accordance with at least one transmission limitation associated with the digital data.

14. The method according to claim 10, wherein said ephemeral authentication key is furthermore received in step (j), said authentication key being transmitted through the encrypted communication channel.

15. The method according to claim 14, wherein the authentication operation performed in step (k) further comprises the substeps of:

(k1) generating said random number;

(k2) sending said random number to the source;

(k3) receiving from the source the result of a calculation performed on the basis of the random number and of the authentication key; and (k4) verifying the result of said calculation on the basis of the random number generated in step (k1) and of the authentication key received in step (j).

* * * * *